United States Patent
Murofushi

(10) Patent No.: US 9,087,244 B2
(45) Date of Patent: Jul. 21, 2015

(54) RFID TAG POSITION DETECTION APPARATUS AND RFID TAG POSITION DETECTION METHOD

(75) Inventor: Nobuo Murofushi, Susono (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 802 days.

(21) Appl. No.: 13/303,376

(22) Filed: Nov. 23, 2011

(65) Prior Publication Data

US 2012/0133487 A1    May 31, 2012

(30) Foreign Application Priority Data

Nov. 30, 2010 (JP) ................................. 2010-267619

(51) Int. Cl.
G08B 13/14 (2006.01)
G06K 7/10 (2006.01)
G06K 17/00 (2006.01)

(52) U.S. Cl.
CPC ........ G06K 7/10099 (2013.01); G06K 7/10079 (2013.01); G06K 2017/0045 (2013.01)

(58) Field of Classification Search
None
See application file for complete search history.

(56) References Cited

U.S. PATENT DOCUMENTS

| | | | |
|---|---|---|---|
| 2005/0212676 A1* | 9/2005 | Steinberg | 340/572.8 |
| 2007/0001809 A1* | 1/2007 | Kodukula et al. | 340/10.1 |
| 2008/0258876 A1* | 10/2008 | Overhultz et al. | 340/10.2 |
| 2009/0002165 A1* | 1/2009 | Tuttle | 340/572.1 |
| 2009/0036060 A1* | 2/2009 | Takahashi et al. | 455/67.14 |
| 2010/0328073 A1* | 12/2010 | Nikitin et al. | 340/572.1 |

FOREIGN PATENT DOCUMENTS

JP    2007-114003    5/2007

OTHER PUBLICATIONS

Japanese Office Action for Japanese Application No. 2010-267619 mailed on Aug. 27, 2013.

* cited by examiner

*Primary Examiner* — Curtis King
(74) *Attorney, Agent, or Firm* — Amin, Turocy & Watson, LLP

(57) ABSTRACT

According to one embodiment, an RFID tag position detection apparatus includes a transmission antenna, at least four reception antennas, and a measurement unit. The transmission antenna transmits a command to an RFID tag. At least four reception antennas receive a response from the RFID tag and output a reception signal. The measurement unit measures time differences between timings at which the reception signals are output from the respective reception antennas and calculates relative coordinates of the RFID tag with respect to a position of the RFID tag position detection apparatus based on the respective measured time differences.

17 Claims, 10 Drawing Sheets

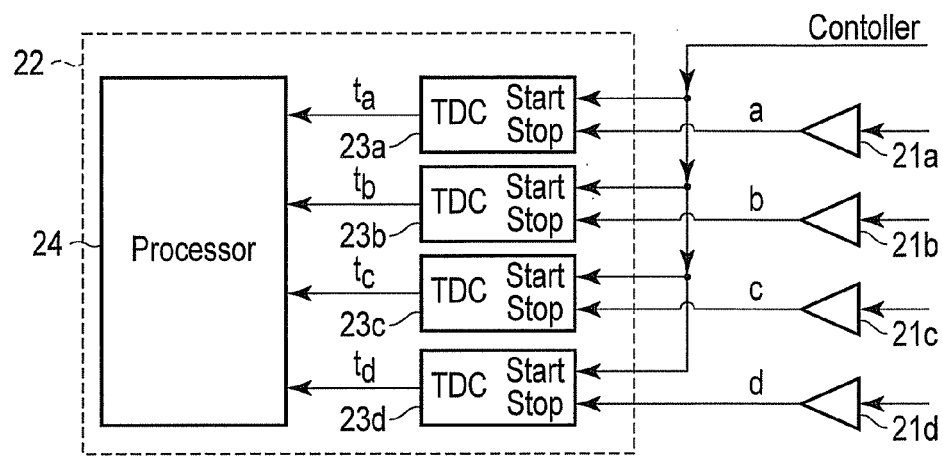
F I G. 3
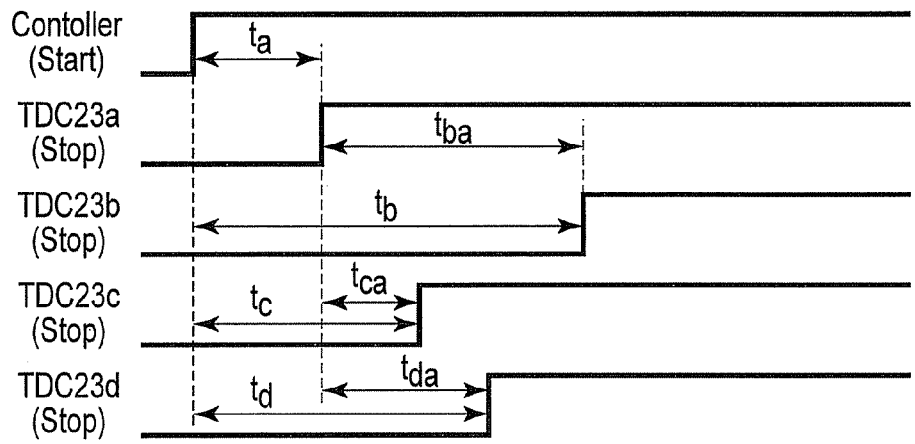
F I G. 4
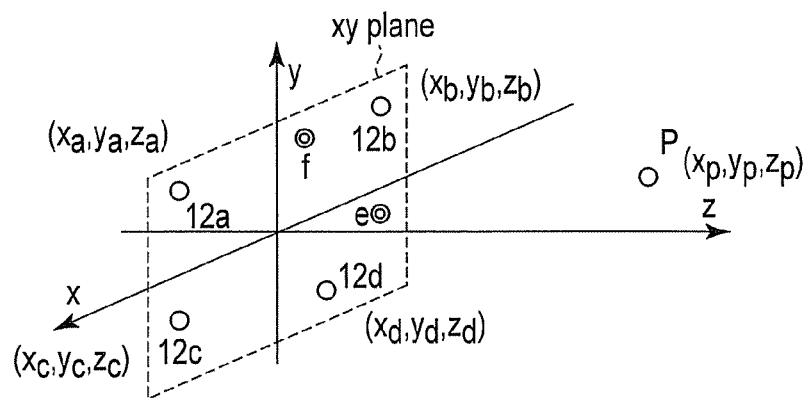
F I G. 5

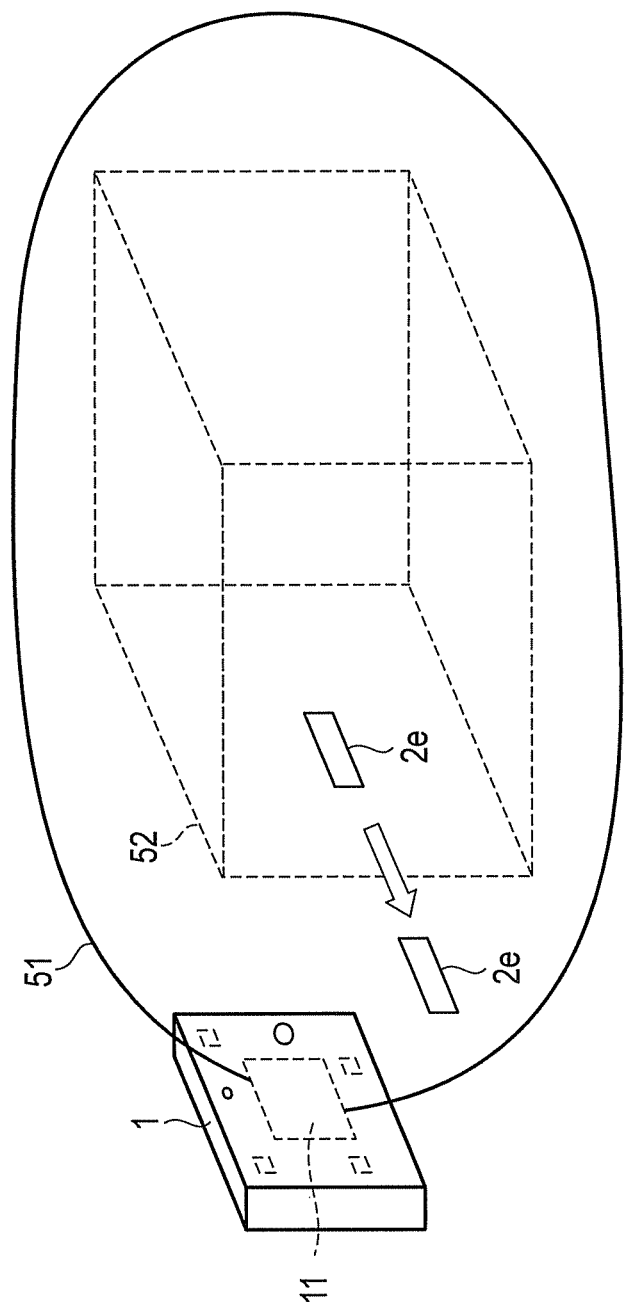
F I G. 15

RFID TAG POSITION DETECTION APPARATUS AND RFID TAG POSITION DETECTION METHOD

CROSS-REFERENCE TO RELATED APPLICATIONS

This application is based upon and claims the benefit of priority from the prior Japanese Patent Application No. 2010-267619, filed on Nov. 30, 2010, the entire contents of which are incorporated herein by reference.

FIELD

Embodiments described herein relate generally to RFID tag position detection apparatus and method executing radio communication with an RFID (Radio Frequency Identification) tag.

BACKGROUND

An RFID tag (which is also called a radio tag or a responsor, or the like) includes an antenna, a radio communication unit, and a storage unit. The storage unit of each RFID tag stores identification information which does not overlap each other between RFID tags. An interrogator (which is also called reader and writer) transmits an inquiry signal to the RFID tag, the RFID tag performs a process in response to the inquiry signal. For example, there is known an RFID tag that replies only when the identification information stored by the RFID tag and the identification information included in the inquiry signal from the reader and writer are identical with each other.

The RFID tag having such a function is used in various fields such as logistics for article management. In recent years, for example, there has been introduced a system for sales or stock management using the RFID tags at stores selling various articles.

Business treating articles in large quantity desires to easily recognize the places where the respective articles are located as well as management of the kinds of articles or the number of articles. In order to detect the positions of the RFID tags, it is possible to use a method of calculating the absolute positions of the RFID tags by performing a process of acquiring the absolute positions at which the reader and writer communicate with the RFID tags and the distances with the RFID tags at least at three locations.

However, when the above method is used, the reader and writer have to acquire the position of the reader and writer and the distances with the RFID tags at least at three locations. Therefore, it takes relatively long time to acquire the positions of the RFID tags. Further, the radio wave use efficiency becomes deteriorate since the reader and writer have to communicate with the same RFID tag at least three times.

In consideration of this circumstance, it is necessary to devise a method of detecting the positions of the RFID tags rapidly.

BRIEF DESCRIPTION OF THE DRAWINGS

FIG. 3 is a schematic block diagram illustrating a measurement unit according to the first embodiment.

FIG. 4 is a diagram illustrating signal waveforms in an operation of TDCs according to the first embodiment.

FIG. 5 is a diagram illustrating coordinates calculation of an RFID tag according to the first embodiment.

FIG. 15 is a schematic view for explaining a notification function of tag absence according to the first embodiment.

DETAILED DESCRIPTION

In general, according to one embodiment, an RFID tag position detection apparatus includes a transmission antenna, at least four reception antennas, and a measurement unit.

The transmission antenna transmits a command to an RFID tag. At least four reception antennas receive a response from the RFID tag and output a reception signal. The measurement unit measures time differences between timings at which the reception signals are output from the respective reception antennas and calculates relative coordinates of the RFID tag with respect to a position of the RFID tag position detection apparatus based on the respective measured time differences.

Hereinafter, embodiments will be described with reference to the drawings.

First Embodiment

Configuration of Main Units

First, the configuration of the main units of an RFID tag position detection apparatus 1 according to a first embodiment will be described.

Figure 1:
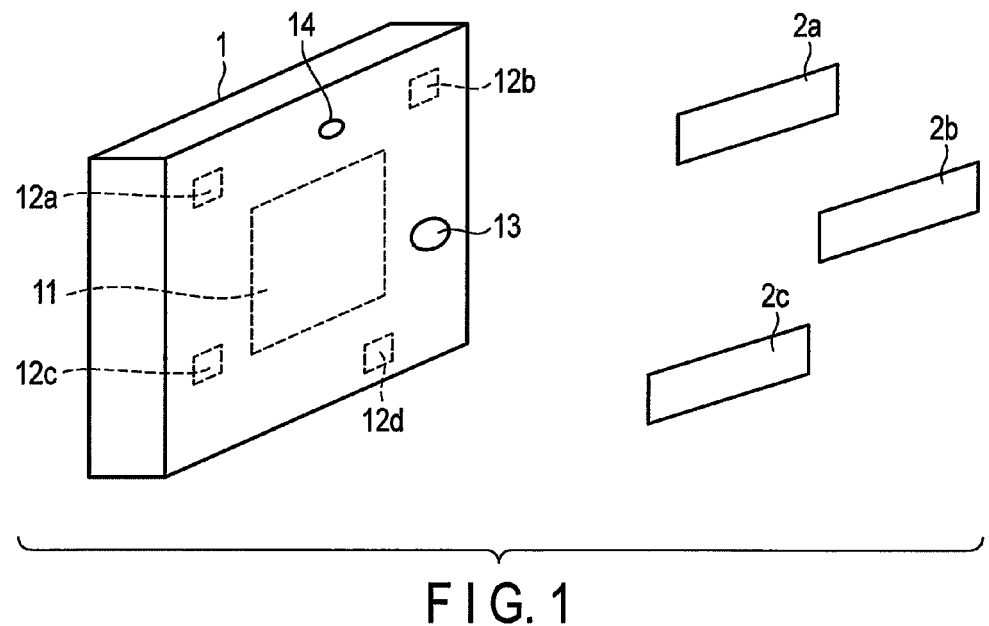
FIG. 1 is a schematic perspective view illustrating an RFID tag position detection apparatus and RFID tags according to a first embodiment.
Figure 2:
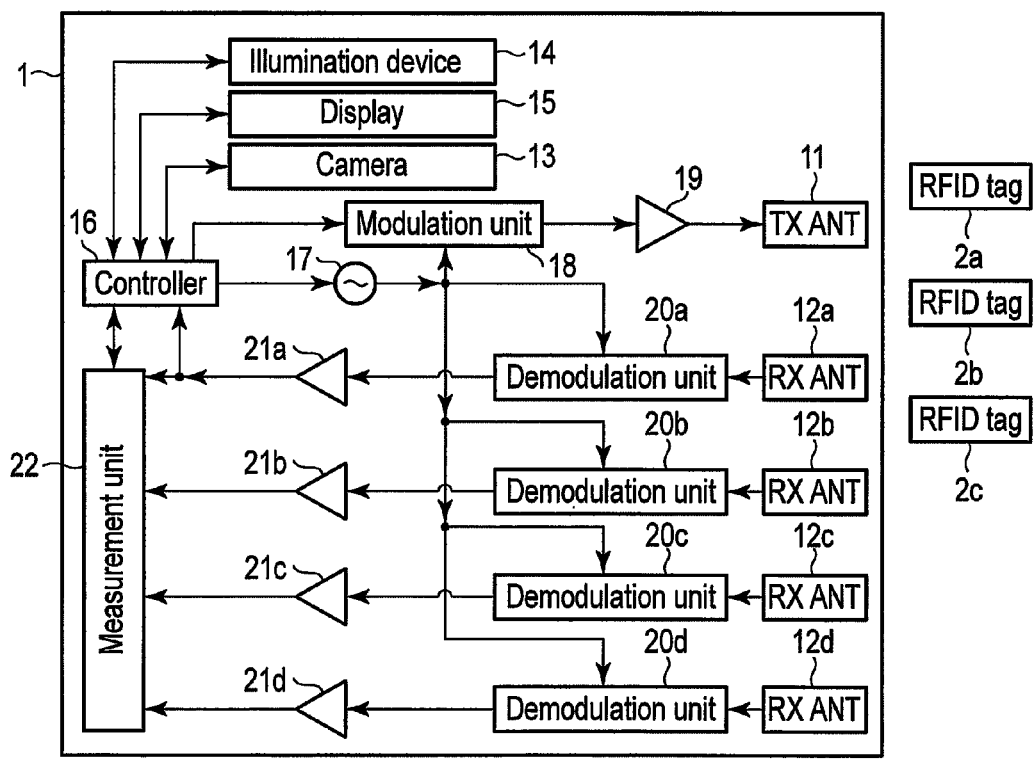
FIG. 2 is a schematic block diagram illustrating the RFID tag position detection apparatus according to the first embodiment.

FIG. 1 is a schematic perspective view illustrating an RFID tag position detection apparatus 1 and RFID tags 2. FIG. 2 is a schematic block diagram illustrating the RFID tag position detection apparatus 1.

The RFID tag position detection apparatus 1 has a rectangular casing, for example, as shown in FIG. 1. A lens of a camera 13 and the illumination hole of an illumination device 14 are provided on one surface of the casing. Radio waves are emitted through the surface on which the lens and the illumination hole are provided to execute radio communication with the RFID tags 2 (2a, 2b, 2c, etc.).

As shown in FIG. 2, the RFID tag position detection apparatus 1 includes a transmission antenna 11, four reception antennas 12 (12a, 12b, 12c, and 12d), the camera 13, the illumination device 14, a display 15, a controller 16, an oscillation unit 17, a modulation unit 18, a power amplification unit 19, demodulation units 20 (20a, 20b, 20c, and 20d), and amplification units 21 (21a, 21b, 21c, and 21d), and a measurement unit 22 therein.

The controller 16 includes a CPU (Central Processing Unit) and a storage unit (not shown) and operates in accordance with a program stored in the storage unit to control each unit. That is, the controller 16 controls the camera 13, the illumination device 14, the display 15, and the measurement unit 22, performs a transmission process and a reception process, and communicates with a superordinate apparatus such as a PC.

The oscillation unit 17 generates a high-frequency signal and outputs the high-frequency signal to the modulation unit 18 and the demodulation units 20a to 20d. The oscillation frequency of the oscillation unit 17 is the same as the frequency of the carrier wave transmitted to the RFID tags 2. The oscillation frequency can be changed in accordance with a signal from the controller 16.

The modulation unit 18 synthesizes transmission information output from the controller 16 with the output of the oscillation unit 17 to generate a high-frequency signal and outputs the generated high-frequency signal to the power amplification unit 19. The modulation unit 18 outputs only the carrier waves if there is no transmission information in some cases. The power amplification unit 19 amplifies the high-frequency signal input from the modulation unit 18 and outputs the amplified high-frequency signal to the transmission antenna 11.

The transmission antenna 11 emits the high-frequency signal output from the power amplification unit 19 as radio waves toward a space. The transmission antenna 11 is a directivity antenna that has a feature of strongly emitting the radio waves in a specific direction. For example, a planar patch antenna may be used.

The reception antennas 12a to 12d convert the received radio waves into high-frequency signals (reception signal) and output the high-frequency signals to the demodulation units 20a to 20d, respectively. The reception antennas 12a to 12d are ideally points from the viewpoint of the accuracy of position detection. However, actually, it is necessary to have a size which depends to the received radio waves. Further, it is not necessary to use a directivity antenna with a high gain. Therefore, it is preferable to use a miniaturized antenna by shortening the wavelength using a material with a high dielectric constant.

Further, the reception antennas 12a to 12d are preferably disposed in a direction in which the radiation gain of the transmission antenna 11 is low. The RFID tags 2 perform back-scatter modulation using the carrier waves arriving from the space as power and return a response. Therefore, the RFID tag position detection apparatus 1 performs an operation of receiving a back-scatter signal while transmitting the carrier waves. By suppressing the power of the radio waves returning from the transmission antenna 11 to the reception antennas 12a to 12d through the space, it is possible to reduce the burden on a process of cancelling the transmission and the return in a reception circuit.

The radio waves emitted from the RFID tags 2 arrive in the reception antennas 12a to 12d through a space, respectively. Since the distances between the RFID tags 2 and the reception antennas 12a to 12d are different from each other, there is a difference between arriving times to the reception antennas 12a to 12d. The speed of the radio waves passing through a free space is about $3 \times 10^8$ m/s. For example, when a difference between the distance between the RFID tag 2 and the reception antenna 12a and the distance between the RFID tag 2 and the reception antenna 12b is 1 m, the arriving time difference of about 3.3 ns occurs. When the difference is 10 cm, the arriving time difference of about 330 ps occurs.

When the reception antennas 12a to 12d are arranged on the same plane and the reception antennas 12a to 12d are disposed at the vertexes of a rectangle, the reception antennas 12a to 12d are disposed such that the sum of the corners facing each other is not 180 degrees or the centers of two diagonal lines do not pass through the same point.

When the reception antennas 12a to 12d are not disposed on the same plane, the reception antennas 12a to 12d are disposed at the positions which are not the vertex of a regular tetrahedron.

The demodulation unit 20a synthesizes the high-frequency signals output from the reception antenna 12a and the output of the oscillation unit 17, converts the synthesized signal into a baseband signal, and outputs the baseband signal to the amplification unit 21a. The output baseband signal includes amplitude information, which is generally called RSSI (Received Signal Strength Indication), used to measure a received-signal strength. Likewise, the demodulation units 20b to 20d synthesize the high-frequency signals output from the reception antennas 12b to 12d and the output of the oscillation unit 17, convert the synthesized signals into baseband signals, and outputs the baseband signals to the amplification units 21b to 21d, respectively.

The amplification unit 21a amplifies and saturates the signal from the demodulation unit 20a and outputs the acquired signal as binary information indicating two levels of "H (High)" and "L (Low)". Since the back-scatter signal returned by the RFID tag 2 is binary information, response information returned by the RFID tag 2 can be reproduced even in the case. Likewise, the amplification units 21b to 21d amplify and output the baseband signals output from the demodulation units 20b to 20d, respectively. Further, comparators may be used instead of the amplification units 21a to 21d.

The signal output from the amplification unit 21a is input into the controller 16 and the measurement unit 22. The controller 16 reproduces the signal output from the amplification unit 21a as reception data (response signal) and performs processing in accordance with the data. The signals output from the amplification units 21b to 21d are likewise input to the measurement unit 22, but the signals are not input to the controller 16. Further, only the signal output from the amplification unit 21a is input into the controller 16. However, the signals output from the amplification units 21b to 21d may be configured to be input into the controller 16.

A timing at which the output level of each of the amplification units 21a to 21d is changed from "L" to "H" is determined by a time in which the radio waves from the RFID tag 2 arrive in each of the reception antennas 12a to 12d. The measurement unit 22 measures time differences among the timings at which the reception signals are output from the reception antennas 12a to 12d based on the inputs from the amplification units 21a to 21d and calculates the coordinates of the RFID tag returning the back-scatter signal based on the respective measured time differences. The calculated coordinates are relative coordinates determined with reference to the position of the RFID tag position detection apparatus 1. The measurement unit 22 outputs the calculated relative coordinate values to the controller 16.

Time Measurement

FIG. 3 is a schematic block diagram illustrating the measurement unit 22. The measurement unit 22 includes four TDC (Time to Digital Converter) 23 (23a, 23b, 23c, and 23d) and a processor 24.

Each of the TDC 23a to 23d includes a Start input terminal, a Stop input terminal, and an output terminal. Each of the TDC 23a to 23d changes the level of the Start input from "L" to "H", and then outputs a digital value in accordance with the time in which the level of the Stop input is changed from "L" to "H". In recent years, a measurement resolution capability of about 10 ps can be obtained using a CMOS (Complementary Metal Oxide Semiconductor) technique of 180 nm process. When a manufacture process rule becomes minute, a resolution capability of measuring a shorter time can be obtained.

The Start input terminal of each of the TDC 23a to 23d is connected to the controller 16. The Stop input terminal of the TDC 23a is connected to the amplification unit 21a. Likewise, the Stop input terminals of the TDC 23b to 23d are connected to the amplification units 21b to 21d, respectively. The output terminal of each of the TDC 23a to 23d is connected to a processor 24.

The operation of the TDC 23a to 23d will be described with reference to signal waveforms shown in FIG. 4.

First, the levels of the Start input and the Stop input in the TDC 23a to 23d are "L". When the level of the start input from the controller 16 becomes "H", each of the TDC 23a to 23d starts to measure the time. When the level of the Stop input in the TDC 23a becomes "H", the TDC 23a outputs a measurement time $t_a$. Next, when the level of the Stop input in the TDC 23c becomes "H", the TDC 23c outputs a measurement time $t_c$. When the level of the Stop input in the TDC 23d becomes "H", the TDC 23d outputs a measurement time $t_d$. When the level of the Stop input in the TDC 23b becomes "H", the TDC 23b outputs a measurement time $t_b$.

The processor 24 includes a storage unit (not shown). The processor 24 operates in accordance with a program stored in the storage unit and calculates the arriving time difference of each signal from each of the input measurement times $t_a$, $t_b$, $t_c$, and $t_d$. An arriving time difference $t_{ba}$ between the reception antennas 12a and 12b is calculated by $t_b - t_a$. An arriving time difference $t_{ca}$ between the reception antennas 12a and 12c is calculated by $t_c - t_a$. An arriving time difference $t_{da}$ between the reception antennas 12a and 12d is calculated by $t_d - t_a$.

After the arriving time differences $t_{ba}$, $t_{ca}$, and $t_{da}$ are calculated, the coordinates of the RFID tag 2 returning the back-scatter response are calculated using the coordinates of the reception antennas 12a to 12d. The calculated coordinates of the RFID tag 2 are the relative coordinates from the RFID tag position detection apparatus 1.

The controller 16 allows the measurement unit 22 to start the time measurement by setting the Start input in each of the TDC 23a to 23d to "H". The timing at which the Start input in each of the TDC 23a to 23d is set to "H" is determined in accordance with a signal input from the reception antenna 12a to the controller 16. A method of determining the timing will be described later.

Coordinates Calculation

The coordinates calculation of the RFID tag 2 will be described with reference FIG. 5.

It is in advance known that the coordinates of the reception antenna 12a is ($x_a$, $y_a$, $z_a$), the coordinates of the reception antenna 12b is ($x_b$, $y_b$, $z_b$), the coordinates of the reception antenna 12c is ($x_c$, $y_c$, $z_c$), and the coordinates of the reception antenna 12d is ($x_d$, $y_d$, $z_d$). The coordinates of the reception antennas 12a to 12d are stored in advance in the storage unit or the like of the processor 24.

On the assumption that P ($x_p$, $y_p$, $z_p$) is the coordinates of the RFID tag 2 returning the back-scatter response and C is the delivery speed of radio waves, the following expressions are established based on the coordinates of the reception antennas 12a to 12d and the arriving time differences $t_{ba}$, $t_{ca}$, and $t_{da}$.

$$C \cdot t_{ba} = \sqrt{(x_p - x_b)^2 + (y_p - y_b)^2 + (z_p - z_b)^2} - \sqrt{(x_p - x_a)^2 + (y_p - y_a)^2 + (z_p - z_a)^2}$$

$$C \cdot t_{ca} = \sqrt{(x_p - x_c)^2 + (y_p - y_c)^2 + (z_p - z_c)^2} - \sqrt{(x_p - x_a)^2 + (y_p - y_a)^2 + (z_p - z_a)^2}$$

$$C \cdot t_{da} = \sqrt{(x_p - x_d)^2 + (y_p - y_d)^2 + (z_p - z_d)^2} - \sqrt{(x_p - x_a)^2 + (y_p - y_a)^2 + (z_p - z_a)^2}$$

Since the values other than $x_p$, $y_p$, and $z_p$ are known in advance, the values of $x_p$, $y_p$, and $z_p$ can be evaluated by solving the foregoing three simultaneous equations. The solutions of the nonlinear simultaneous equations can be calculated using a numeral calculation method such as the Newton method. If the reception antennas 12a to 12d are disposed on the same plane, two solutions are present. If there is a plane in which the transmission antenna 11 satisfies "z=0", a solution (positive solution) in which the antenna gain is high may be effective. In this way, the relative coordinates of the RFID tag 2 returning the back-scatter response can be acquired.

Hereinafter, communication between the RFID tag position detection apparatus 1 and the RFID tag 2 will be described with reference to FIG. 6.

In this embodiment, it is assumed that the RFID tag position detection apparatus 1 and the RFID tag 2 communicate with each other in conformity with the Class 1 Generation 2 standard (hereinafter, referred to as C1G2 standard) of EPC global which recently come into wide use.

Figure 6:
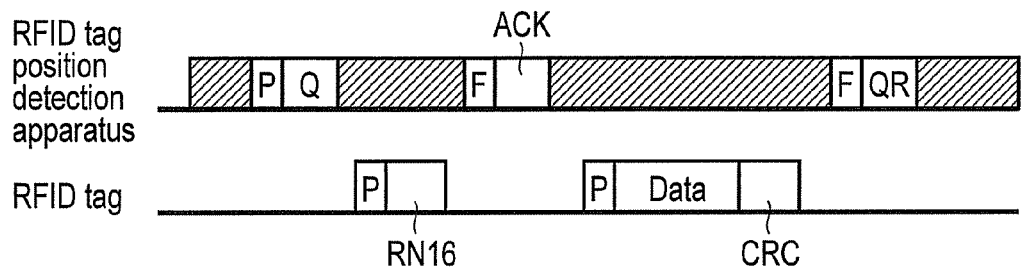
FIG. 6 is a diagram for explaining communication between the RFID tag position detection apparatus and the RFID tag according to the first embodiment.

Transmission data of the RFID tag position detection apparatus 1 is shown in the upper part of FIG. 6. A portion indicated by diagonal lines indicates a state where only carrier waves are transmitted. Transmission data of the RFID tag 2 is shown in the lower part of FIG. 6. In communication according to the C1G2 standard, the RFID tag position detection apparatus 1 first transmits carrier waves. The RFID tag 2 operates when receiving the carrier waves.

The RFID tag position detection apparatus 1 continuously transmits preamble (P) and Query (Q) indicating reading start. When the RFID tag 2 receives the preamble (P), the RFID tag 2 determines a reception speed. When the RFID tag 2 receives Query (Q) by making synchronization so as to continuously receive the data, the RFID tag 2 performs setting in accordance with the contents of Query (Q). Thereafter, the RFID tag 2 transmits a response at a slot selected at random in the C1G2 standard. In this embodiment, however, the RFID tag 2 immediately transmits the response.

After the RFID tag 2 receives Query (Q), the RFID tag 2 continuously transmits a preamble (P) and RN16, which is 16-bit pseudo-random numbers. RN16 is retained during the subsequent communication and is used as a cipher character string. When the RFID tag position detection apparatus 1 receives the preamble (P) and RN16, the RFID tag position detection apparatus 1 continuously transmits Frame-sync (F) for making frame synchronization and ACK for informing the RFID tag 2 of correct reception. When the RFID tag 2 receives ACK, the RFID tag 2 transmits a preamble (P), data (Data), and CRC (Cyclic Redundancy Check). The data (Data) includes unique identification information allocated to each RFID tag 2, that is, EPC (Electronic Product Code) of the C1G2 standard. CRC is a code added to detect an error of data transmission.

If the RFID tag position detection apparatus 1 receives the preamble (P), the data (Data), and CRC, the RFID tag position detection apparatus 1 detects whether there is a transmission error using CRC. Accordingly, if the RFID tag position detection apparatus 1 determines that the RFID tag position detection apparatus 1 correctly receives the preamble (P), the data (Data), and CRC, the RFID tag position detection apparatus 1 continuously transmits Frame-sync (F) and QueryRep (QR). On the other hand, if the RFID tag position detection apparatus 1 determines that the RFID tag position detection apparatus 1 does not correctly receive the preamble (P), the data (Data), and CRC, the RFID tag position detection apparatus 1 transmits NAK indicating incorrect reception instead of QueryRep (QR) and requests retransmission to the RFID tag 2. If there is only one RFID tag 2 within a communication domain of the RFID tag position detection apparatus 1, the communication is completed by the processes hitherto performed.

When there is the plurality of RFID tags 2 within the communication domain of the RFID tag position detection apparatus 1, another RFID tag 2 transmits the preamble (P) and RN16 after QueryRep (QR). When the RFID tag position detection apparatus 1 receives RN16, the RFID tag position detection apparatus 1 transmits Frame-sync (F) and ACK. The RFID tag 2 receiving the Frame-sync (F) and ACK transmits a preamble (P), data (Data), and CRC. When the RFID tag position detection apparatus 1 correctly receives the data (Data), the RFID tag position detection apparatus 1 transmits Frame-sync (F).

By repeating the above-described processes, the RFID tag position detection apparatus 1 detects identification information regarding the plurality of RFID tags 2 within the communication domain.

Figure 7:
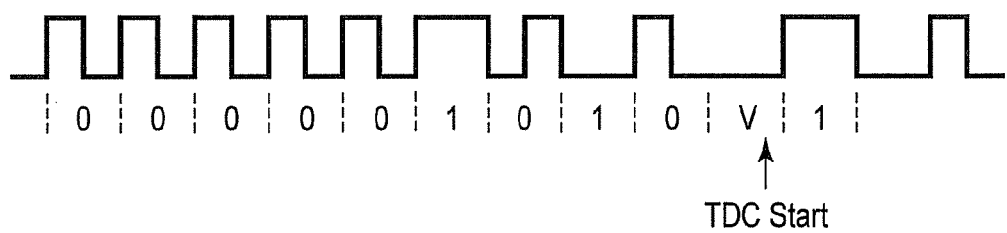
FIG. 7 is a diagram illustrating the waveform of a preamble according to the first embodiment.

FIG. 7 is a diagram illustrating the waveform of a preamble that the RFID tag 2 transmits to the RFID tag position detection apparatus 1. The preamble shown in FIG. 7 is a preamble when FM0 concurrence is used in the C1G2 standard. When the FM0 concurrence indicates "0", the level is reversed from "H" to "L" or from "L" to "H" by centering around 1 bit. When the FM0 concurrence indicates "1", the level is constant by centering around 1 bit and is not changed. Further, the level is reversed when the bit is changed from a given bit to the subsequent bit. "V" is a bit which does not conform the rule of the FM0 concurrence and is shown only in the middle of the preamble.

Normally, the same pattern is repeated to make bit synchronization in the head of the preamble. Thereafter, a pattern usable in another determination is used to notice the boundary with the preamble and information continuing after the preamble. In FIG. 7, a portion in which "0" continues five times is used to make the bit synchronization and data starts after "1010V1".

In this way, the RFID tag position detection apparatus 1 communicates with the RFID tag 2 such that the RFID tag position detection apparatus 1 transmits ACK and then receives the data including the identification information. Accordingly, the controller 16 can predict a timing at which a reception signal level is changed, after the RFID tag position detection apparatus 1 transmits ACK and then receives the preamble and makes the bit synchronization. The controller 16 can measure the times $t_a$, $t_b$, $t_c$, and $t_d$, in which levels of the received signals of the reception antennas 12a to 12d are subsequently changed to "H" by simultaneously changing the Start inputs of the TDC 23a to 23d to "H" before the level of the received signal is changed initially from "L" to "H" immediately after the bit synchronization is made and "V" is detected.

In the block diagram of FIG. 2, the output of the amplification unit 21a is input into the controller 16 and the reception data is acquired from the RFID tag 2. In some cases, the distance between the RFID tag 2 and the reception antenna 12a is not the shortest and the distances between the RFID tag 2 to the other reception antennas 12b to 12d are shorter. When the reception antennas 12a to 12d are disposed as in FIG. 5 and it is assumed that the reception antenna which is farthest from the reception antenna 12a is the reception antenna 12d, the maximum arriving time difference $t_m$ between the reception antenna 12a and the reception antenna 12d can be expressed as the following expression.

$$t_m = \frac{\sqrt{(x_d - x_a)^2 + (y_d - y_a)^2 + (z_d - z_a)^2}}{C}$$

Even when the reception antenna which is farthest from the reception antenna 12a is another antenna, the maximum arriving time difference $t_m$ between the reception antenna 12a and this antenna can be calculated by the same calculation expression.

In consideration of this fact, the level of the Start input in each of the TDC 23a to 23d may be set to "H" at a time before $t_m$ from the timing at which the level of the reception signal is predicted to be changed from "L" to "H" immediately after the detection of "V". In other words, the timing at which the time measurement starts may be set so that the reception signal level of each of the reception antennas 12a to 12d is changed after the time in which the radio waves transmitted by the maximum distance between the reception antennas.

When the measurement time is too long, the subsequent change point of the reception signal level may appear. Therefore, the measurement preferably ends before the subsequent change point appears. Since a time interval at which the change points of the signal level appear is determined by the transmission speed and an encoding method, a measurement termination time may be determined from that time. In this way, it is possible to apprehend the level change timings of the signals arriving in all of the reception antennas 12a to 12d irrespective of the disposition of the reception antennas 12a to 12d and the RFID tags 2. Further it is possible to specify the positions of the RFID tags 2 based on the measured time differences.

In this way, the RFID tag position detection apparatus 1 can detect the identification information and the positions of the RFID tags 2 at a time since the RFID tag position detection apparatus 1 detects the positions of the RFID tags 2 using the preambles of the data including the identification information. If the RFID tag position detection apparatus 1 detects the identification information of the plurality of RFID tags 2, the RFID tag position detection apparatus 1 can also detect the position corresponding to each identification information.

In this embodiment, the Start input of each of the TDC 12a to 12d is set to "H" at the position of "V". However, after the bit synchronization is made, the time can be measured in the same manner even near the change point of any reception signal level.

Information Displayed on Display

The RFID tag position detection apparatus 1 has a function of calculating the relative coordinates of the RFID tags 2 and displaying, on the display 15, the relative coordinates and the identification information received from the RFID tags 2 at the time of calculating the relative coordinates or information specified based on the identification information by associating the relative coordinates with the identification information or the specified information.

Figure 8:
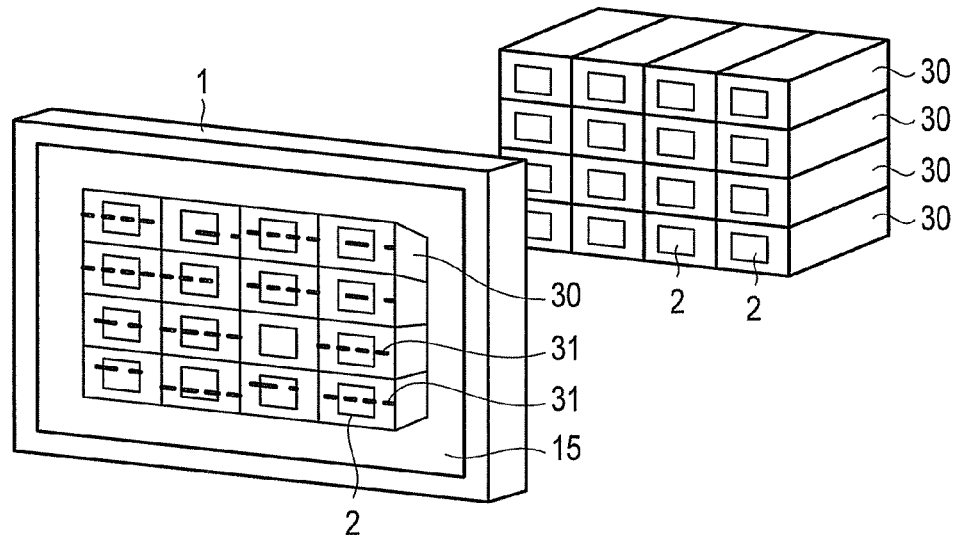
FIG. 8 is a schematic diagram illustrating an image viewed on a display according to the first embodiment.

FIG. 8 is a schematic diagram illustrating an image viewed on the display 15 of the RFID tag position detection apparatus 1. The display 15 is disposed on the rear surface (which is a surface opposite to the surface on which the lens of the camera 13 or the like is disposed) of the RFID tag position detection apparatus 1.

In the drawing, reference numeral 30 denotes an article on which each RFID tag 2 is attached. All of the RFID tags 2 are located within the communication domain of the RFID tag position detection apparatus 1. An image captured by the camera 13 is displayed on the display 15. Information 31 based on the identification information detected from each RFID tag 2 is displayed in an overlapping manner (in an association manner) on the image corresponding to the relative coordinates of each RFID tag 2 detected by communication with each RFID tag 2. The information 31 may be identification information itself detected from each RFID tag 2. However, the information 31 may be article information which can be connected to the identification information. In this case, for example, a table in which the identification information and the article information correspond to each other may be stored in advance in the storage unit of the controller 16 and the article information connected to the identification information may be specified with reference to the table. Thus, when the information 31 is connected to the article information, the kinds of articles displayed on the display 15 can be recognized with ease.

Figure 9:
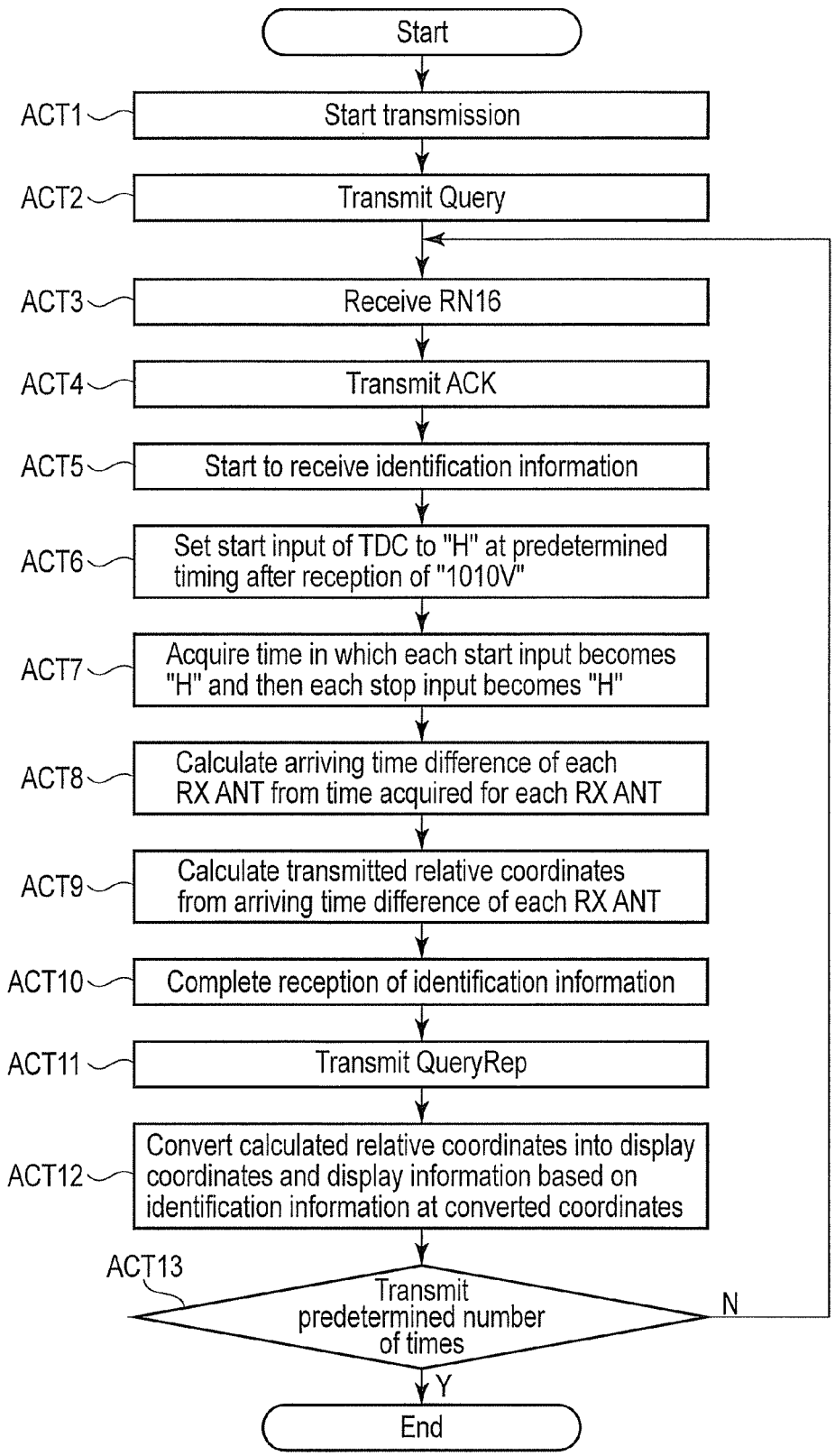
FIG. 9 is a flowchart illustrating an operation of each unit associated with display of information according to the first embodiment.

The operation of each unit associated with the display of the information 31 will be described with reference to the flowchart of FIG. 9.

When an instruction to start a process is given by receiving a command from an superordinate apparatus, an image is captured by the camera 13 and is displayed on the display 15. Thereafter, a process shown in FIG. 9 starts.

In the initial process, the positions of the RFID tags 2 within the communication domain are detected by the above-described method (ACT 1 to ACT 11).

That is, the carrier waves start to be transmitted from the transmission antenna 11 (ACT 1) and the RFID tags 2 within the communication domain operate. Next, Query (Q) is transmitted from the transmission antenna 11 (ACT 2) and RN16 for Query (Q) is received by the reception antenna 12a (ACT 3).

Thereafter, ACK is transmitted from the transmission antenna 11 (ACT 4). The data including the identification information of the RFID tag 2 returning the response starts to be received (ACT 5).

Then, the controller 16 sets the level of the Start input of each of the TDC 23a to 23d to "H" at the above-described timing during the reception of "1010V" included in the preamble (P) transmitted from the RFID tag 2 (ACT 6). As a consequence, the times $t_a$, $t_b$, $t_c$, and $t_d$ in which the level of each Start input becomes "H" and then the level of each Stop input becomes "H" are output from each of the TDC 23a to 23d to the processor 24 (ACT 7).

The processor 24 calculates the arriving time differences $t_{ba}$, $t_{ca}$, $t_{da}$ for respective reception antennas 12a to 12d based on the input measurement times $t_a$, $t_b$, $t_c$ and $t_d$ (ACT 8) and calculates the relative coordinates of the RFID tag 2 returning the response based on the arriving time differences (ACT 9).

The data including the identification information is completely received from the RFID tag 2 returning the response after the calculation of the relative coordinates (ACT 10). QueryRep (QR) is transmitted from the transmission antenna 11 (ACT 11).

The calculation in ACT 8 and ACT 9 is performed before the reception of the data is completed in ACT 10. However, the calculation in ACT 8 and ACT 9 may be performed after the reception of the data is completed in ACT 10.

After ACT 11, the controller 16 converts the relative coordinates calculated in ACT 9 into the display coordinates on a screen and displays the information based on the identification information received from the RFID tags 2 at the converted coordinates (ACT 12). Thereafter, it is determined whether QueryRep (QR) is transmitted a predetermined number of times after the process of the shown flowchart starts. If it is determined that QueryRep (QR) is not transmitted the predetermined number of times ("N" in ACT 13), the processes of ACT 3 to ACT 12 are performed on other RFID tags 2 within the communication domain. On the other hand, if it is determined that QueryRep (QR) is transmitted the predetermined number of times ("Y" in ACT 13), the series of processes end.

Figure 10:
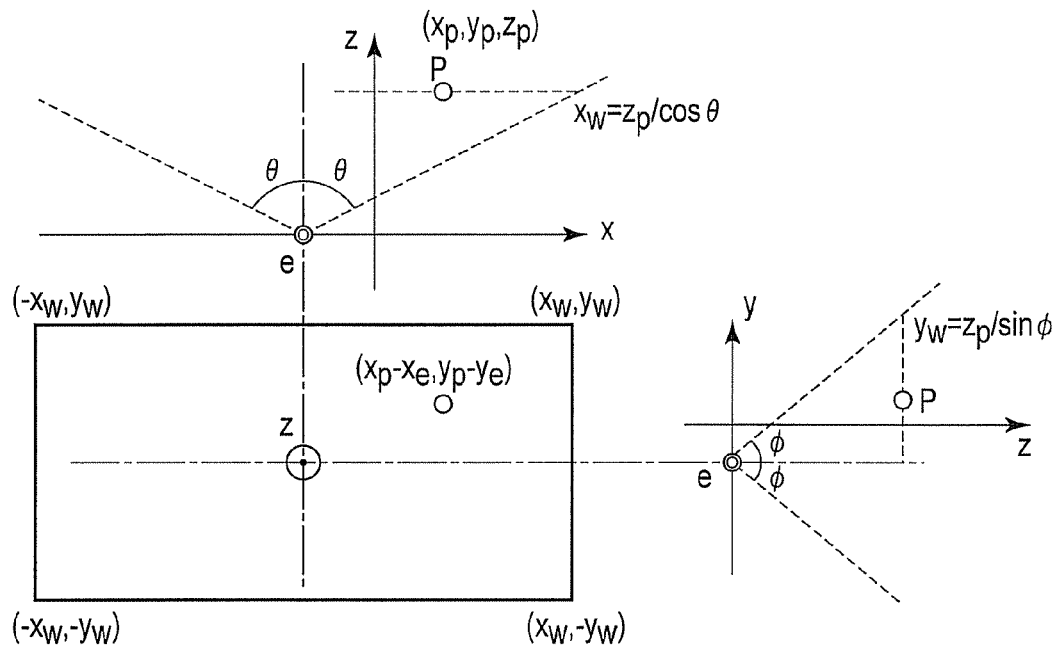
FIG. 10 is a diagram for explaining coordinate conversion to display coordinates according to the first embodiment.

FIG. 10 is a diagram for explaining the coordinate conversion performed in ACT 12. The x-z plane is shown in the upper part, the y-z plane is shown in the lower right part, and screen display coordinates on the display 15 are shown in the lower left part. It is assumed that the coordinates of the RFID tag 2, the relative coordinates of which are detected, is a P point $(x_p, y_p, z_p)$, the coordinates of an imaging point of the camera 13 is an e point $(x_e, y_e, z_e)$, and a relationship of "$z_e=0$" is satisfied. The acquisition range of the image by the camera 13 is a range of $\pm\theta$ on the x-z plane and is a range of $\pm\phi$ on the y-z plane.

An image captured by the camera 13 is shown on the x-y plane. Therefore, the three-dimensional coordinates have to be converted into image coordinates in order to display the position of the RFID tag 2.

The distance between the imaging point of the camera 13 to the RFID tag 2 on the z-axis is $z_p$. The range of the x axis at the distance $z_p$ of the image captured by the camera 13 is $-z_p/\cos\theta$ to $z_p/\cos\theta$. When it is assumed that $x_w=z_p/\cos\theta$, $-x_2 \le$ (acquisition range of x axis at distance $z_p$)$\le x_w$. The x coordinate of the RFID tag 2 in the image captured by the camera 13 is expressed as $x_p-x_e$.

The range of the y axis at the distance $z_p$ acquired by the camera 13 is $-z_p/\sin\phi$ to $z_p/\sin\phi$. When it is assumed that $y_w=z_p/\sin\phi$, $-y_w \le$ (acquisition range of y axis at distance $z_p$)$\le y_w$. They coordinate of the RFID tag 2 in the image captured by the camera 13 is expressed as $y_p-y_e$.

When the image is displayed on the display 15, the information 31 corresponding to the RFID tag 2 is displayed at the position corresponding to the calculated display coordinates $(x_p-x_e, y_p-y_e)$ of the RFID tag 2 on the assumption that $(x_w, y_w)$ is set to the right upper of the display image, $(-x_w, y_w)$ is set to the left upper of the display image, $(x_w, -y_w)$ is set to the right lower of the display image, $(-x_w, -y_w)$ is set to the left lower of the display image.

In this way, since the identification information and the relative positions of the plurality of RFID tags 2 can be acquired and people can be informed of the positions of the plurality of RFID tags 2 acquired, arrival and shipment management or inventory clearance of articles can be performed efficiently.

When the information 31 such as identification information is not displayed at the place where the RFID tag 2 is expected to be present in the display image, it can be determined that the RFID tag 2 expected to be present may not be read at the place. Further, it is possible to know the position of the RFID tag 2 which may not be immediately read.

Beam Illumination at Tag Position

The RFID tag position detection apparatus 1 has a function of detecting the position of the RFID tag 2 and illuminating the position with a beam from the illumination device 14.

Figure 11:
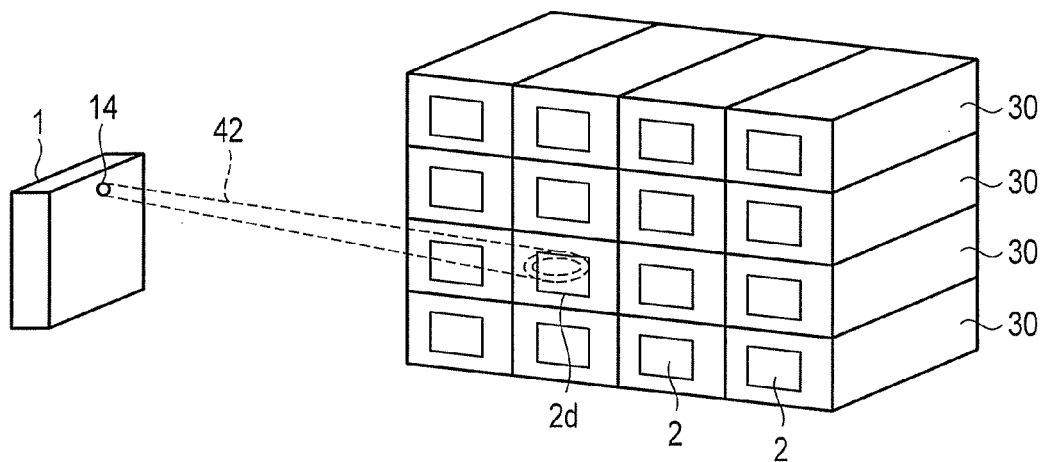
FIG. 11 is a schematic view illustrating the illumination of a beam according to the first embodiment.

FIG. 11 is a schematic view illustrating illumination of a beam by the illumination device 14. The function is used when the identification information of each RFID tag 2 is determined and the specific RFID tag 2 is searched among the plurality of RFID tags 2. That is, the RFID tag position detection apparatus 1 transmits a command that only the RFID tag 2d storing specific identification information replies, acquires the relative coordinates of the RFID tag 2d replying the command, allows the illumination device 14 to illuminate the acquired relative coordinates with a beam 42, and notifies the position of the RFID tag 2d.

The operation of each unit associated with the illumination of the beam will be described with reference to the flowchart of FIG. 12.

Figure 12:
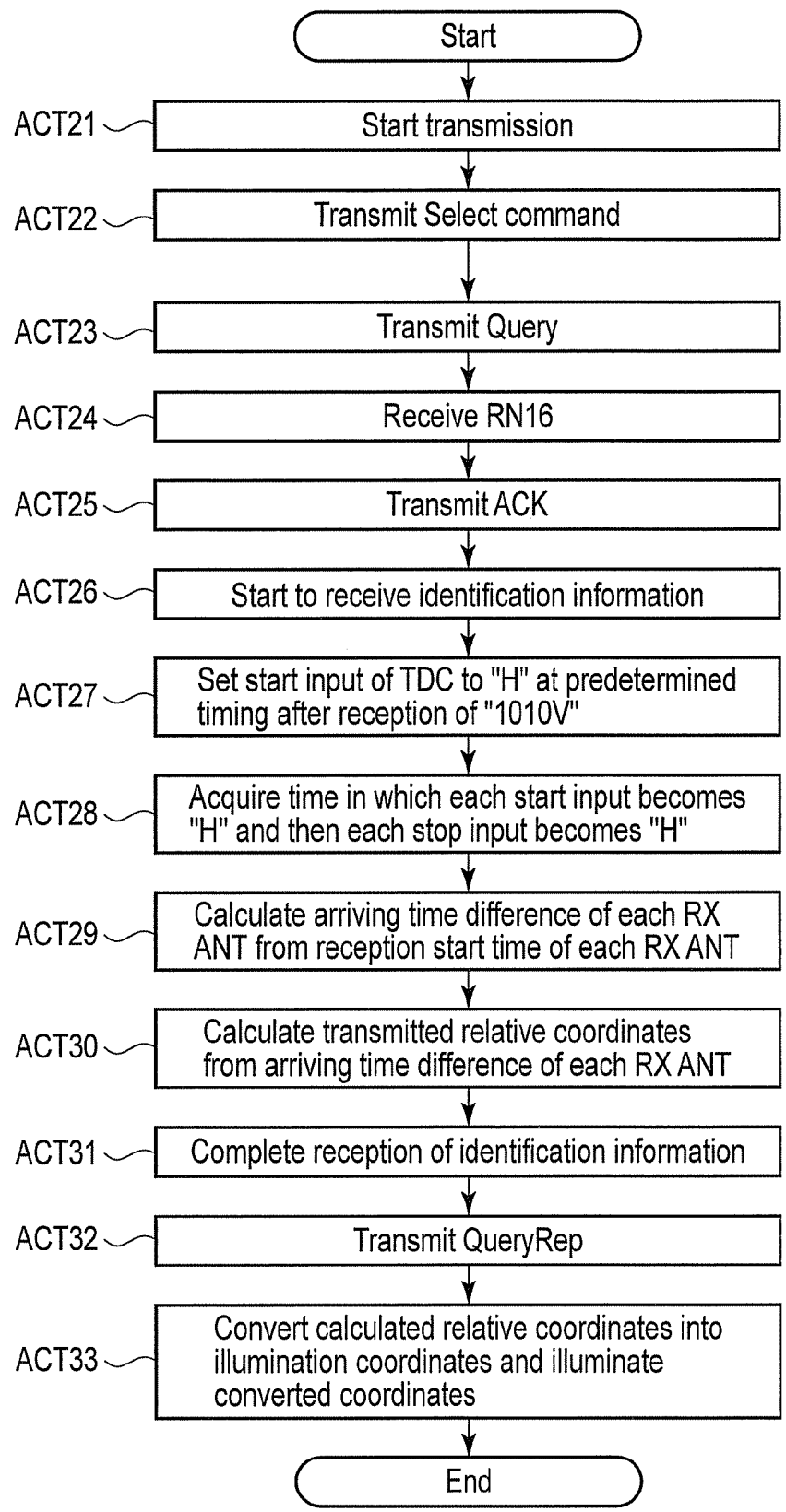
FIG. 12 is a flowchart illustrating the operation of each unit associated with illumination of a beam according to the first embodiment.

When an instruction to start a process is received by receiving a command from a superordinate apparatus, a process performed on the RFID tag 2 indicated by the command starts as shown in FIG. 12.

In the initial process, the position of the RFID tag 2 to be initially processed is detected (ACT 21 to ACT 32). That is, the carrier waves starts to be transmitted from the transmission antenna 11 (ACT 21) and the RFID tags 2 within the communication domain operate. Next, a Select command designating the RFID tag 2 to be processed is transmitted from the transmission antenna 11 (ACT 22). The RFID tag 2 receiving the Select command replies Query (Q) or the like only when the command designates this RFID tag 2.

Subsequently, Query (Q) is transmitted from the transmission antenna 11 (ACT 23) and RN16 returned by the RFID tag 2 to be processed is received by the reception antenna 12a (ACT 24). Thereafter, ACK is transmitted from the transmission antenna 11 (ACT 25), and then the data including the identification information of the RFID tag 2 to be processed starts to be received (ACT 26). Then, the controller 16 sets the level of the Start input of each of the TDC 23a to 23d to "H" at the above-described timing during the reception of "1010V" included in the preamble (P) transmitted from the RFID tag 2 (ACT 27). As a consequence, the times $t_a$, $t_b$, $t_c$, and $t_d$ in which the level of each Start input becomes "H" and then the level of each Stop input becomes "H" are output from each of the TDC 23a to 23d to the processor 24 (ACT 28). The processor 24 calculates the arriving time differences $t_{ba}$, $t_{ca}$, and $t_{da}$ for respective reception antennas 12a to 12d based on the input measurement times $t_a$, $t_b$, $t_c$ and $t_d$ (ACT 29) and calculates the relative coordinates of the RFID tag 2 to be processed based on the arriving time differences (ACT 30). The data including the identification information is completely received from the RFID tag 2 to be processed after the calculation of the relative coordinates (ACT 31). QueryRep (QR) is transmitted from the transmission antenna 11 (ACT 32).

The calculation in ACT 29 and ACT 30 is performed before the reception of the data is completed in ACT 31. However, the calculation in ACT 29 and ACT 30 may be performed after the reception of the data is completed in ACT 31.

After ACT 32, the controller 16 converts the relative coordinates calculated in ACT 9 into the illumination coordinates of the beam and allows the illumination device 14 to illuminate the converted coordinates with the beam (ACT 33). Then, the series of processes end.

Hereinafter, the configuration of the illumination device 14 and a method of calculating the illumination coordinates will be described.

Figure 13:
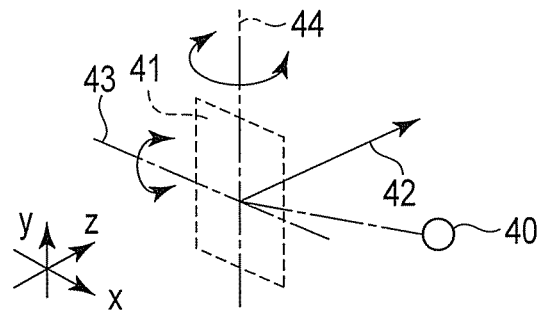
FIG. 13 is a schematic view illustrating the general configuration of an illumination device according to the first embodiment.

FIG. 13 is a schematic view illustrating the general configuration of the illumination device 14. The illumination device 14 includes a light source 40 emitting light and a mirror 41 reflecting the light emitted from the light source 40 and generating a beam.

The light source 40 outputs the light toward the mirror 41 and the mirror 41 changes the traveling direction of the beam. An arrow 42 shown in the drawing indicates the traveling direction of the beam emitted from the RFID tag position detection apparatus 1. The mirror 41 is held so as to rotate toward a rotation axis 43 in the x-axis direction and a rotation axis 44 in the y-axis direction. The illumination device 14 can adjust the direction of the beam by rotating the mirror 41 around the rotation axes 43 and 44 and changing the direction of the mirror 41.

Figure 14:
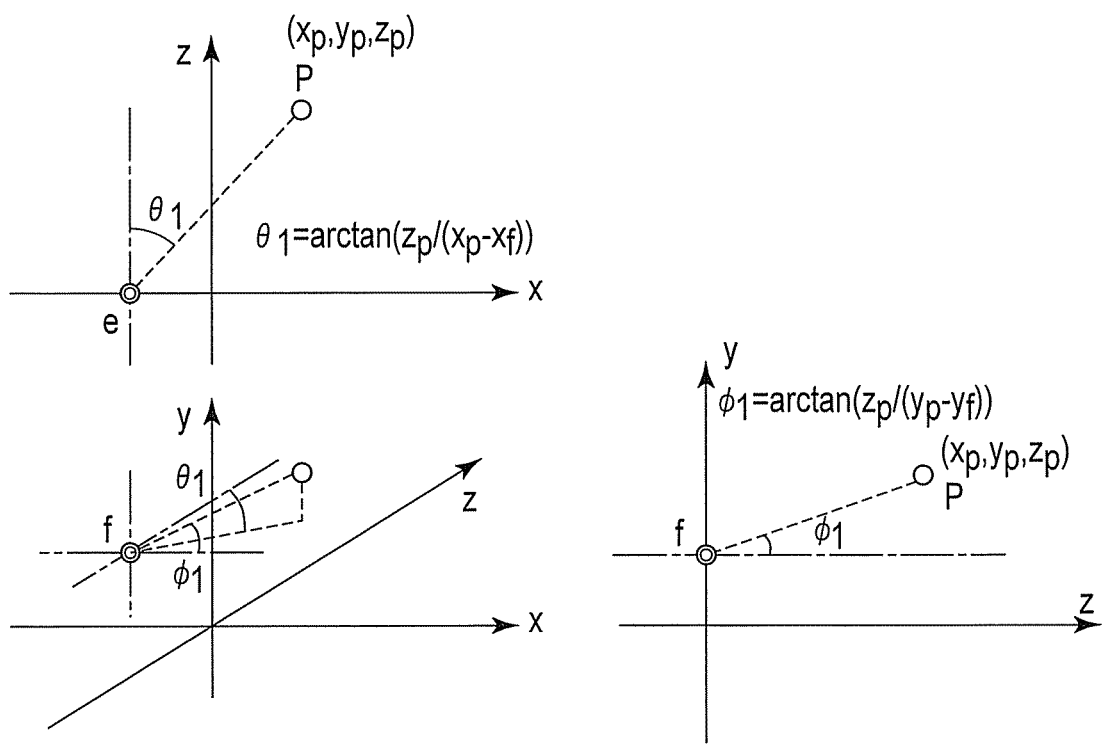
FIG. 14 is a diagram for explaining a relationship between coordinate conversion and an angle of a mirror according to the first embodiment.

FIG. 14 is a diagram for explaining a relationship between the coordinate conversion performed in ACT 33 and the angle of the mirror 41. The x-z plane is shown in the upper part, the y-z plane is shown in the lower right part, and a three-dimensional coordinate system of x, y, and z axes is shown in the lower left part. It is assumed that the coordinates of the RFID tag 2 to be processed, the relative coordinates of which are acquired, are each a P point $(x_p, y_p, z_p)$, the coordinates illuminated with the beam are an f point $(x_f, y_f, z_f)$, and a relationship of "$z_f=0$" is satisfied.

The initial illumination direction is the z direction perpendicular to the x-y plane from the f point before the angle of the mirror 41 is adjusted. Then, the P point is located in the direction of $\theta_1=\arctan\{z_p/(x_p-x_f)\}$ from the f point on the x-z plane and the P point is located in the direction of $\phi_1=\arctan\{z_p/(y_p-x_f)\}$ from the f point on the y-z plane. Accordingly, the beam can be emitted toward the coordinate P point of the RFID tag 2 to be processed, by rotating the mirror 41 by $\theta_1$ using the rotation axis 43 of the y-axis direction as the axis and rotating the mirror 41 by $\phi_1$ using the rotation axis 44 of the x-axis direction as the axis.

When the beam is emitted toward the specific RFID tag 2 in this way, the position of the RFID tag 2 being searched can be easily made to be known. Further, since an error caused in the measurement or calculation is included in the calculated relative coordinates, the actual coordinates and the calculated coordinates of the RFID tag 2 may be slightly different from each other in some cases. Therefore, the illumination range may be enlarged by diffusing the beam.

Notification of Tag Absence

The RFID tag position detection apparatus 1 has a function of notifying that the RFID tag 2 present within a predefined setting range comes out of the setting range.

FIG. 15 is a schematic view for explaining the function. The setting range 52 is defined inside the communication domain 51 of the transmission antenna 11 and the reception antennas 12a to 12d. The relative coordinates of the setting range 52 are stored in advance in the storage unit or the like of the controller 16. First, it is assumed that an RFID tag 2e is present within the setting range 52, and then the RFID tag 2e is moved out of the setting range 52. In regard to the function, the RFID tag position detection apparatus 1 detects whether the RFID tag 2e comes from the inside of the setting range 52 to the outside of the setting range 52. If the RFID tag position detection apparatus 1 detects that the RFID tag 2e comes out of the setting range 52, the RFID tag position detection apparatus 1 notifies that the RFID tag 2e comes out of the setting range 52.

The operation of each unit associated with the function will be described with reference to the flowchart of FIG. 16.

Figure 16:
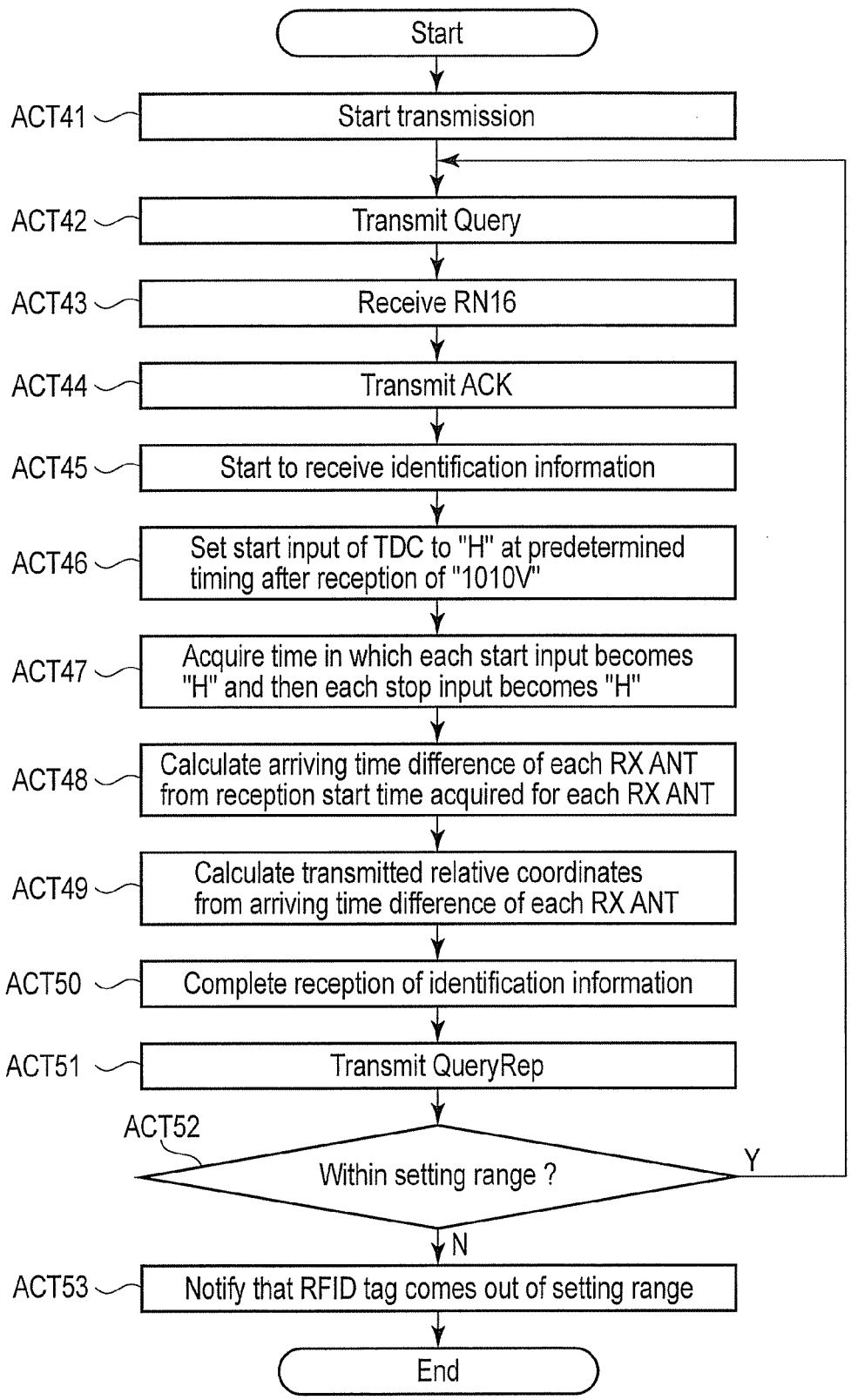
FIG. 16 is a flowchart illustrating the operation of each unit associated with notification of tag absence according to the first embodiment.

When an instruction to start a process is received by receiving a command from a superordinate apparatus, a process shown in FIG. 16 starts.

In the initial process, the position of the RFID tag 2 present within the communication domain 51 is detected by the above-described method (ACT 41 to ACT 51). That is, the carrier waves starts to be transmitted from the transmission antenna 11 (ACT 41) and the RFID tags 2 within the communication domain operate. Subsequently, Query (Q) is transmitted from the transmission antenna 11 (ACT 42) and RN16 for the Query (Q) is received by the reception antenna 12a (ACT 43). Thereafter, ACK is transmitted from the transmission antenna 11 (ACT 44), and then the data including the identification information of the RFID tag 2 returning the response starts to be received (ACT 45). Then, the controller 16 sets the level of the Start input of each of the TDC 23a to 23d to "H" at the above-described timing during the reception of "1010V" included in the preamble (P) transmitted from the RFID tag 2 (ACT 46). As a consequence, the times $t_a$, $t_b$, $t_c$, and $t_d$ in which the level of each Start input becomes "H" and then the level of each Stop input becomes "H" are output from each of the TDC 23a to 23d to the processor 24 (ACT 47). The processor 24 calculates the arriving time differences $t_{ba}$, $t_{ca}$, and $t_{da}$ for respective reception antennas 12a to 12d based on the input measurement times $t_a$, $t_b$, $t_c$ and $t_d$ (ACT 48) and calculates the relative coordinates of the RFID tag 2 returning the response based on the arriving time differences (ACT 49). The data including the identification information is completely received from the RFID tag 2 returning the response after the calculation of the relative coordinates (ACT 50). QueryRep (QR) is transmitted from the transmission antenna 11 (ACT 51).

The calculation in ACT 48 and ACT 49 is performed before the reception of the data is completed in ACT 50. However, the calculation in ACT 48 and ACT 49 may be performed after the reception of the data is completed in ACT 50.

After ACT 51, the controller 16 determines whether the RFID tag 2 is present within the setting range 52 based on the relative coordinates calculated in ACT 49 and the coordinates of the setting range 52 stored in the storage unit (ACT 52). As a consequence, if the controller 16 determines that the RFID tag 2 is present within the setting range 52 ("Y" in ACT 52), the process of ACT 42 to ACT 52 are performed on another RFID tag 2 present within the communication domain 51. On the other hand, if the controller 16 determines that the RFID tag 2 is not present within the setting range 52 ("N" in ACT 52), the controller 16 notifies that the RFID tag 2 comes out of the setting range 52 (ACT 53) and the series of processes end.

The notification in ACT 53 may be performed by displaying a message or the like on the display 15 or may be performed by connecting a speaker or the like to the RFID tag position detection apparatus 1 and outputting a voice. Through this notification, it is possible to notify that the RFID tag 2 comes out of the defined area.

The case has been described in which the RFID tag 2 comes out of the setting range 52. However, if it is detected that the RFID tag 2 is moved from the outside of the setting range 52 to the inside of the setting range 52, the notification may be given.

As described above, the RFID tag position detection apparatus 1 according to the embodiment detects the positions of the RFID tags 2 using the arriving time differences of the response radio waves from the RFID tags 2 to the four reception antennas 12a to 12d. With such a configuration, the RFID tag position detection apparatus 1 may not be moved to a plurality of positions if the positions of the RFID tags 2 are detected. Accordingly, it is possible to detect the positions of the RFID tags 2 rapidly. Further, since the RFID tag position detection apparatus 1 does not need to communicate with the RFID tags 2 a plurality of times, the radio waves efficiency does not deteriorate.

The RFID tag position detection apparatus 1 has the function of displaying the information regarding the RFID tag 2, the position of which is detected on the display image of the display 15 in an overlapping manner or the function of emitting the beam toward the detected position. By using the function, the locations of the specific RFID tag 2 can be very easily confirmed.

Further, the RFID tag position detection apparatus 1 has the function of detecting that the RFID tag 2 present within a predetermined range comes out of the range and notifying that the RFID tag 2 comes out of the range. By using the function, the entrance and exit of the RFID tag 2 within a predetermined range can be very easily managed.

Second Embodiment

Next, a second embodiment will be described.

The same reference numerals are given to the same constituent elements as those of the first embodiment and the description thereof will be described, if necessary.

Irregularity of circuit delay or irregularity of wiring lengths may occur in circuits between the reception antennas 12a to 12d and the measurement unit 22. For example, a slight difference may occur between the time at which the reception signal is input from the reception antenna 12a and is input into the TDC 23a and the time at which the reception signal is input from the reception antenna 12b and is input into the TDC 23b. When the slight difference is corrected; it is possible to reduce the gap between the calculated relative coordinates and the actual coordinates.

Accordingly, in this embodiment, the processor 24 has a function (acquisition unit) of acquiring correction values of the arriving time differences $t_{ba}$, $t_{ca}$, and $t_{da}$ so that the gap is as small as possible and calculates the relative coordinates of the RFID tags 2 based on the arriving time differences $t_{ba}$, $t_{ca}$, and $t_{da}$ corrected by the acquired correction values.

An exemplary method of correcting the gap between the arriving time difference between the reception antennas 12a to 12d will be described.

The correction values are acquired when the RFID tag position detection apparatus 1 operates in a correction mode. At this time, the RFID tag 2 is disposed in advance at the location where the RFID tag 2 is distant from the reception antennas 12a and 12b by the same, distance. In this state, the relative coordinates are acquired by the method described in the first embodiment.

At this time, since the arriving times of the radio wave to the reception antennas 12a and 12b are the same as each other, the delivery delay difference in the circuit is shown as an input time difference $\Delta t_{ba}$ between the TDC 23a and the TDC 23b. The input time difference $\Delta t_{ba}$ is stored as the correction value, for example, in the storage unit of the processor 24.

When there is no delivery delay difference in the circuit, $\Delta t_{ba}$ is equal to 0. Likewise, the time differences $\Delta t_{ca}$ and $\Delta t_{da}$ are acquired as the correction values between the reception antennas 12a and 12c and the reception antennas 12a and 12d.

In order to calculate the relative coordinates of the RFID tags 2 in a normal operation mode after the correction values are acquired, the time differences $\Delta t_{ba}$, $\Delta t_{ca}$, and $\Delta t_{da}$ are subtracted from the arriving time differences $t_{ba}$, $t_{ca}$, and $t_{da}$ acquired by the processor 24 so as to be corrected and the relative coordinates of the RFID tags 2 are calculated using the corrected values.

Next, another method of correcting the gap between the arriving time differences will be described.

In this example, the RFID tag 2 is first disposed at the position at which the relative coordinates are determined in advance. Then, the distances between the RFID tag 2 and the respective reception antennas 12a to 12d are determined. At this time, the theoretical arriving time differences between the reception antennas 12a to 12d can be calculated from the distances between the RFID tags 2 and the reception antennas 12a to 12d and the delivery speed of the radio waves. The calculated time difference values may be input from the outside into the RFID tag position detection apparatus 1 or may be calculated by the controller 16.

Next, the relative coordinates of the RFID tags 2 are acquired in a correction mode. At this time, the reception arriving time differences and the theoretical reception arriving time differences are compared to each other to calculate respective difference values. The calculated difference values are stored as the correction values in, for example, the storage unit of the processor 24.

Thereafter, in order to calculate the relative coordinates of the RFID tags 2 in the normal operation mode, the arriving time differences $t_{ba}$, $t_{ca}$, and $t_{da}$ are corrected as in the first example using the respective correction values stored in the storage unit.

As described above, according to this embodiment, there is provided the function of correcting the calculated arriving time differences $t_{ba}$, $t_{ca}$, and $t_{da}$ and the relative positions of the RFID tags 2 are detected using the corrected arriving time differences. In this way, since the error caused due to the irregularity of circuit delay or irregularity of wiring lengths is cancelled, the accuracy of the position detection of the RFID tags 2 are considerably improved.

Of course, the same advantages as those of the first embodiment are obtained.

Third Embodiment

Next, a third embodiment will be described.

The same reference numerals are given to the same constituent elements as those of the first and second embodiments and the description thereof will be described, if necessary.

In this embodiment, the processor 24 of the RFID tag position detection apparatus 1 according to the first and second embodiments has a function of calculating the absolute coordinates of the RFID tags 2. The absolute coordinates are coordinates uniquely determined irrespective of the position of the RFID tag position detection apparatus.

In order to calculate the absolute coordinates, the RFID tags 2 are mounted on fixed objects such as pillars in a building where the RFID tag position detection apparatus 1 is used. The absolute coordinates $(x_h, y_h, z_h)$ of the RFID tags 2 are acquired and are stored in the storage unit or the like of the processor 24. In this case, the absolute coordinates may be stored in the RFID tag 2 attached to the fixed object and the absolute coordinates of the same RFID tag 2 may be acquired by reading the absolute coordinates at any timing by the RFID tag position detection apparatus 1.

The RFID tag 2, the absolute coordinates of which are known and the RFID tag 2, the absolute coordinates of which are unknown, communicate with each other to acquire the respective relative coordinates without moving the RFID tag position detection apparatus 1. The relative coordinates of the RFID tag 2, the acquired absolute coordinates of which are known, are $(x_g, y_g, z_g)$ and the relative coordinates of the RFID tag 2, the absolute coordinates of which are unknown, are $(x_p, y_p, z_p)$.

The processor 24 can calculate the absolute coordinates of the RFID tag 2, the absolute coordinates of which are unknown as $(x_h+x_p-x_g, y_h+y_p-y_g, z_h+z_p-z_g)$ from the coordinates hitherto acquired.

The calculated absolute coordinates are notified by the display on the display 15 or by sound output from a speaker. In this way, it is possible to know not only the relative coordinates of the RFID tags 2 with reference to the RFID tag position detection apparatus 1 but also the absolute coordinates of the RFID tags 2 with reference to a building or the like. Of course, the same advantages as those of the first and second embodiments are obtained.

Fourth Embodiment

Next, a fourth embodiment will be described.

The same reference numerals are given to the same constituent elements as those of the first to third embodiments and the description thereof will be described, if necessary.

In this embodiment, the measurement unit of the above-describe embodiments has another configuration and the other configuration is the same. Therefore, the measurement unit will be described in detail.

Figure 17:
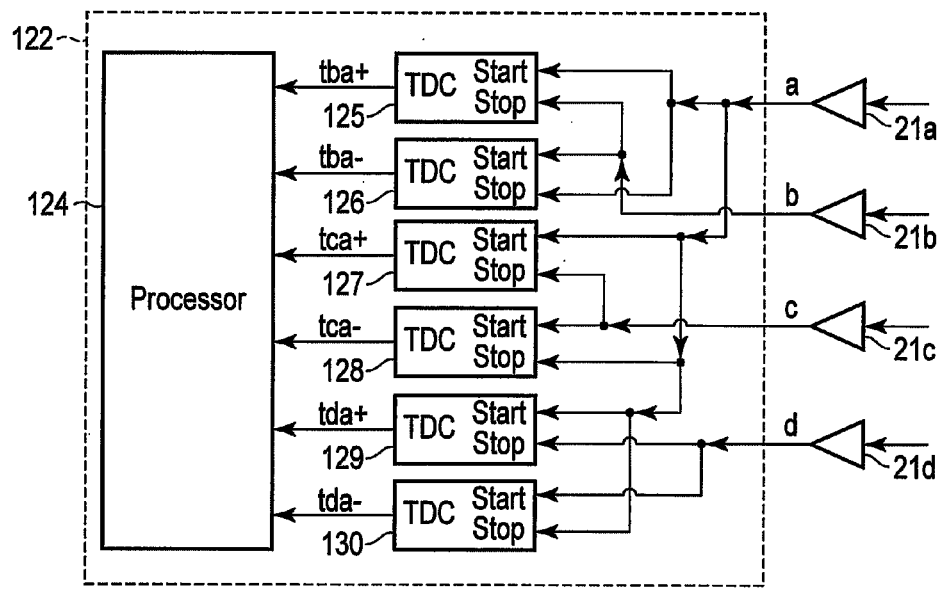
FIG. 17 is a schematic block diagram of a measurement unit according to a fourth embodiment.

FIG. 17 is a schematic block diagram illustrating the measurement unit. In the block diagram, the measurement unit 22 shown in FIG. 3 is substituted by a measurement unit 122. The measurement unit has a configuration in which signal from the control unit 16 is not used in the Start input of the TDC.

The measurement unit 122 includes the TDC 125 to the TDC 130 and a processor 124. The TDC 125 sets the output of the amplification unit 21a to the Start input, sets the output of the amplification unit 21b to the Stop input, and outputs a time $t_{ba+}$ in which the Start input becomes "H" and then the Stop input becomes "H" to the processor 124. The TDC 126 sets the output of the amplification unit 21b to the Start input, sets the output of the amplification unit 21a to the Stop input, and outputs a time $t_{ba-}$ in which the Start input becomes "H" and then the Stop input becomes "H" to the processor 124.

The TDC 127 sets the output of the amplification unit 21a to the Start input, sets the output of the amplification unit 21c to the Stop input, and outputs a time $t_{ca+}$ in which the Start input becomes "H" and then the Stop input becomes "H" to the processor 124. The TDC 128 sets the output of the amplification unit 21c to the Start input, sets the output of the amplification unit 21a to the Stop input, and outputs a time $t_{ca-}$ in which the Start input becomes "H" and then the Stop input becomes "H" to the processor 124.

The TDC 129 sets the output of the amplification unit 21a to the Start input, sets the output of the amplification unit 21d to the Stop input, and outputs a time $t_{da+}$ in which the Start input becomes "H" and then the Stop input becomes "H" to the processor 124. The TDC 130 sets the output of the amplification unit 21d to the Start input, sets the output of the amplification unit 21a to the Stop input, and outputs a time $t_{da-}$ in which the Start input becomes "H" and then the Stop input becomes "H" to the processor 124.

The order in which the outputs of the amplification units 21a and 21b become "H" is different depending on the disposition of the RFID tags 2 and the RFID tag position detection apparatus 1. When the output of the amplification unit 21a first becomes "H", the arriving time difference between the reception antennas 12a and 12b for TDC 125 is measured. Since the time in which the output of the amplification unit 21b becomes "H" and then the output of the amplification unit 21a becomes "H" is measured in the TDC 126, the time $t_{ba-}$ is longer than the time $t_{ba+}$. On the contrary, when the output of the amplification unit 21b first becomes "H", the arriving time difference between the reception antennas 12a and 12b for the TDC 126 is measured. Since the time in which the output of the amplification unit 21a becomes "H" and then the output of the amplification unit 21b becomes "H" is measured in the TDC 125, the time $t_{ba+}$ is longer than the time $t_{ba-}$. Thus, the processor 124 uses the shorter time between the input times $t_{ba+}$ and $t_{ba-}$ as the time used in the calculation.

Likewise, the shorter time between the times $t_{ca+}$ and $t_{ca-}$ is used as the time used in the calculation and the shorter time between the times $t_{da+}$ and $t_{da-}$ is used as the time used in the calculation An example of the input and output waveforms of the TDC 125 to the TDC 130 are shown to describe the operation of the measurement unit. In the drawing, a to d indicate the output signals of the amplification units 21a to 21d, respectively. When the output of the amplification unit 21a becomes "H", the Start inputs of the TDC 127 and the TDC 129 become "H" and the time measurement starts.

Thereafter, when the output of the amplification unit 21c becomes "H", the Stop input of the TDC 127 becomes "H" and the Start input of the TDC 128 becomes "H". The TDC 127 outputs the time $t_{ca+}$, since the Stop input becomes "H".

Next, when the output of the amplification unit 21d becomes "H", the Stop input of the TDC 129 becomes "H" and the Start input of the TDC 130 becomes "H". The TDC 129 outputs the time $t_{da+}$, since the Stop input becomes "H".

Next, when the output of the amplification unit 21b becomes "H", the Stop input of the TDC 125 becomes "H" and the Start input of the TDC 126 becomes "H". The TDC 125 outputs the time $t_{ba+}$, since the Stop input becomes "H".

Figure 18:
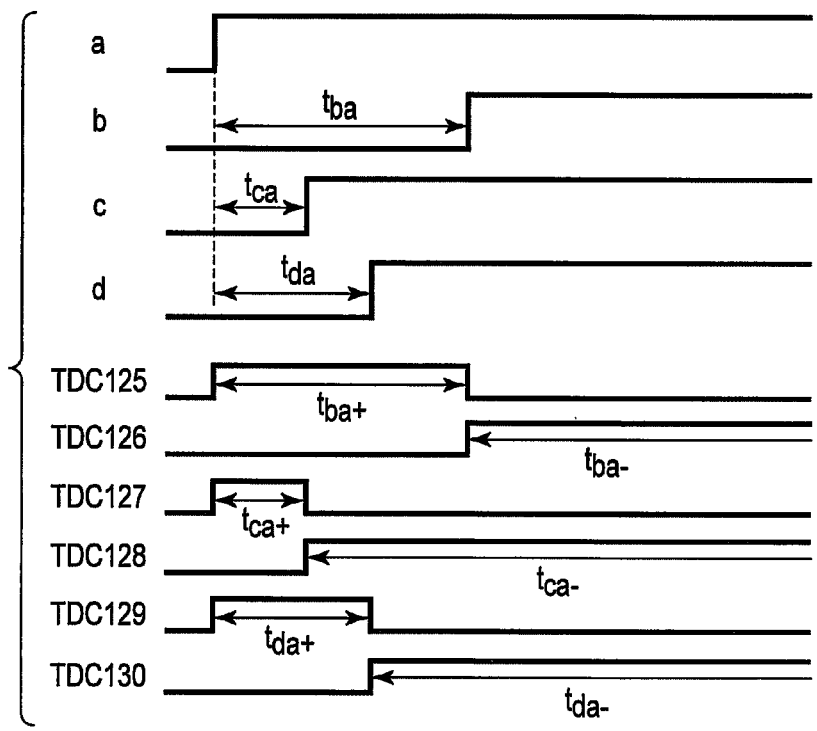
FIG. 18 is a diagram illustrating signal waveforms in the operation of a TDC according to the fourth embodiment.

In the example of FIG. 18, the time measurement does not end in the TDC 126, the TDC 128, and the TDC 130. When the time measurement does not end within the maximum measurable time, the times (the maximum measurable times) up to the measurement end of the TDC 126, the TDC 128, and the TDC 130 are set to $t_{ba-}$, $t_{ca-}$, and $t_{da-}$, respectively.

The processor 124 compares $t_{ba+}$ to $t_{ba-}$, compares $t_{ca+}$ to $t_{ca-}$, and compares $t_{da+}$ to $t_{da-}$, as described above and uses the respective shorter times as the times used for coordinate calculation. The used three times are the arriving time differences in the response from the RFID tags 2 between the reception antennas 12a to 12d. The processor 124 calculates the relative coordinates of the RFID tags 2 giving the response by using the arriving time differences. This configuration can be applied to the first to third embodiments.

Of course, the same advantages as those of the first to third embodiments are obtained.

Modifications

The configurations described in the embodiments can be modified in various forms. For example, specific modifications are as follows.

(1) In the above-described embodiments, the cases have been described in which the four reception antennas, the four demodulation units, and the four amplification units are used. However, the number of reception antennas, the number of demodulation units, and the number of amplification units may be five or more.

When the reception antennas or the like are five or more, the relative coordinates of the RFID tags 2 can be obtained combining and using, for example, the Newton method and the least-square method. When the number of reception arriving time differences increases, the calculated relative coordinates tend to be closer to the actual coordinates. Therefore, when the five or more demodulation units and amplification units are used, it is possible to improve the position detection performance of the RFID tag position detection apparatus.

(2) In the above-described embodiments, the case has been described in which the program for each processing is stored in advance in the storage unit of the controller 16 or the processor 24 or 124. However, the invention is not limited thereto. Each program may be downloaded from a network to the RFID tag position detection apparatus or a program of the same functions stored in a recording medium may be installed to the RFID tag position detection apparatus. Any recording medium can be used, as long as the recording medium can be read by the RFID tag position detection apparatus which can use a CD-ROM or the like. Further, the functions installed in advance or downloaded may be incorporated with an internal OS (Operating System) of the RFID tag position detection apparatus, so that the function may be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus, comprising:
a transmission antenna that transmits a command to an RFID tag;
at least four reception antennas that receive a response from the RFID tag and output a reception signal;
a measurement unit that measures time differences between timings at which the reception signals are output from the respective reception antennas and calculates relative coordinates of the RFID tag with respect to a position of the RFID tag position detection apparatus based on the respective measured time differences;
a plurality of time-to-digital converters that is disposed in the reception antennas, respectively, includes a start input terminal and a stop input terminal into which the reception signal output from the corresponding reception antenna is input, and outputs a time necessary from a change in a level of a signal input from the start input terminal to a change in a level of a signal input from the stop input terminal,
a processor that calculates each time difference based on each time output from each time-to-digital converter; and
a controller that is connected to the start input terminals of the respective time-to-digital converters and supplies a set of signals to the start input terminal in such a manner that signal levels thereof simultaneously change.

2. The apparatus of claim 1, wherein each of the reception antennas is disposed in a direction in which a radiation gain of the transmission antenna is low.

3. The apparatus of claim 1, wherein the processor calculates each time difference by subtracting the time corresponding to the specific time-to-digital converter among the times output from the respective time-to-digital converters from the time corresponding to each of the other time-to-digital converters.

4. The apparatus of claim 1, wherein the controller simultaneously changes the levels of the signals input into the start input terminals of the respective time-to-digital converters, when receiving a preamble included in the response from the RFID tag.

5. The apparatus of claim 1
wherein the controller that performs a process in accordance with data obtained by demodulating the reception signals output from the reception antennas.

6. The apparatus of claim 1,
wherein the measurement unit measures each time difference when the response including unique identification information allocated to the RFID tag is received from the RFID tag, and
wherein the controller associates the relative coordinates calculated based on the respective time differences with the identification information received when each time difference used in the calculation is measured or information specified based on the identification information and outputs the relative coordinates and the identification information or the information specified based on the identification information.

7. The apparatus of claim 6, further comprising:
a display,
wherein the controller displays, on the display, the relative coordinates calculated based on the respective time differences and the identification information received when each time difference used in the calculation is measured or information specified based on the identification information by associating the relative coordinates with the identification information or the information specified based on the identification information.

8. The apparatus of claim 7, further comprising:
a camera that captures an image,
wherein the controller displays the image captured by the camera on the display and displays the identification information or the information specified based on the identification information at a position corresponding to the relative coordinates on the displayed image.

9. The apparatus of claim 8, wherein the controller converts the relative coordinates into coordinates on the displayed image and displays the identification information or the information specified based on the identification information at the converted coordinates on the displayed image.

10. The apparatus of claim 1, further comprising:
an illumination device that outputs a beam toward a direction corresponding to the relative coordinates calculated by the measurement unit.

11. The apparatus of claim 10,
wherein the illumination device includes
a light source that generates light and
a mirror that is held rotatably with respect to a plurality axes, reflects the light emitted from the light source, and generates a beam, and
wherein the illumination device adjusts a direction of the beam to a direction corresponding to the relative coordinates by rotating the mirror around the respective axes.

12. The apparatus of claim 11
wherein the controller that calculates a rotation angle around each axis of the mirror based on the relative coordinates,
wherein the illumination device adjusts the direction of the beam to the direction corresponding to the relative coordinates by rotating the mirror around each axis in accordance with the rotation angle calculated by the controller.

13. The apparatus of claim 1
wherein the controller noticing that the relative coordinates calculated by the measurement unit is out of a predetermined setting range when the relative coordinates is out of the predetermined setting range or that the relative coordinate is within the predetermined setting range when the relative coordinate is within the predetermined setting range.

14. The apparatus of claim 1, wherein the measurement unit acquires a correction value of each time difference measured by the measurement unit, corrects each of the measured time differences based on the correction value, and calculates the relative coordinates the RFID tag based on each of the corrected time differences.

15. The apparatus of claim 14, wherein the measurement unit measures the time differences of timings, at which the reception signal is output, when the reception antennas receive the responses from the RFID tags disposed at the same distance from the reception antennas and sets the measured time differences as the correction values.

16. An apparatus, comprising
a transmission antenna that transmits a command to an RFID tag;
at least four reception antennas that receive a response from the RFID tag and output a reception signal; and
a measurement unit that measures time differences between timings at which the reception signals are output from the respective reception antennas and calculates relative coordinates of the RFID tag with respect to a position of the RFID tag position detection apparatus based on the respective measured time differences,
wherein the measurement unit calculates the relative coordinates of a first RFID tag whose absolute coordinates that are uniquely determined irrespective of the position of the RFID tag position detection apparatus are unknown and the relative coordinates of a second RFID tag whose absolute coordinates are known, the second RFID tag being fixed to a fixed object, and the measurement unit calculates the absolute coordinates of the first RFID tag, based on the calculated relative coordinates of the first and second RFID tags and the absolute coordinates of the second RFID tag.

17. The apparatus of claim 16, wherein the measurement unit calculates the absolute coordinates of the first RFID tag by adding the relative coordinates of the second RFID tag to the absolute coordinates of the second RFID tag and subtracting the relative coordinates of the first RFID tag from the added coordinates.

* * * * *